US00RE42654E

(19) United States
(12) Reissued Patent
Zitting

(10) Patent Number: US RE42,654 E
(45) Date of Reissued Patent: Aug. 30, 2011

(54) SEAL ASSEMBLY

(75) Inventor: Richard D. Zitting, New Harmony, UT (US)

(73) Assignee: SKF USA Inc., Kulpsville, PA (US)

(21) Appl. No.: 10/411,620

(22) Filed: Apr. 10, 2003

Related U.S. Patent Documents

Reissue of:
(64) Patent No.: 6,217,030
Issued: Apr. 17, 2001
Appl. No.: 09/247,252
Filed: Feb. 9, 1999

(51) Int. Cl.
*F16J 9/12* (2006.01)
*F16J 9/20* (2006.01)

(52) U.S. Cl. ..... 277/435; 277/589; 277/905

(58) Field of Classification Search ..... 277/437, 277/562, 582, 584, 586, 589, 905
See application file for complete search history.

(56) References Cited

U.S. PATENT DOCUMENTS 1,347,351 A * 7/1920 Murray et al. ..... 277/584
2,349,170 A * 5/1944 Jackman ..... 277/584
2,765,204 A * 10/1956 Josephson ..... 277/905
3,188,099 A * 6/1965 Johnson et al. ..... 277/437
3,215,441 A 11/1965 Horvereid
3,394,941 A 7/1968 Traub
3,469,853 A 9/1969 Gullick
3,525,530 A * 8/1970 Bauer et al. ..... 277/589
3,540,745 A * 11/1970 Flock ..... 277/437
3,582,094 A * 6/1971 Whittaker ..... 277/584
3,630,532 A * 12/1971 Traub et al. ..... 277/589
3,771,801 A * 11/1973 Burke ..... 277/584
4,268,045 A * 5/1981 Traub ..... 277/589
4,346,647 A * 8/1982 Weaver ..... 277/584
4,468,041 A * 8/1984 Yoshimura et al. ..... 277/584
4,576,386 A 3/1986 Benson et al.
5,467,689 A * 11/1995 Carlin et al. ..... 277/586
5,524,905 A * 6/1996 Thoman et al. ..... 277/584
5,879,010 A * 3/1999 Nilkanth et al. ..... 277/584
6,648,337 B1 * 11/2003 Baehl et al. ..... 277/584

* cited by examiner

*Primary Examiner* — Michael Safavi
(74) *Attorney, Agent, or Firm* — TraskBritt

(57) ABSTRACT

A seal for acceptance in an annular gland in a piston comprises an annular primary sealing element, an annular secondary sealing element disposed radially inwardly of the primary sealing element, and a pair of axially spaced back up rings disposed in axially spaced relation on opposite sides of the primary sealing element and having radially inner portions, respectively, engaged with the primary sealing element so as to lock the backup rings in the gland of the piston.

15 Claims, 3 Drawing Sheets

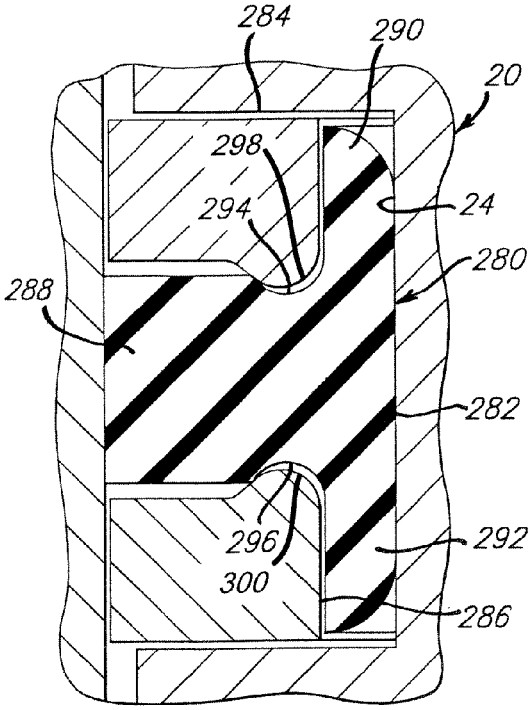
FIG. 11.
(Amended)

SEAL ASSEMBLY

Matter enclosed in heavy brackets [ ] appears in the original patent but forms no part of this reissue specification; matter printed in italics indicates the additions made by reissue.

BACKGROUND OF THE INVENTION

The piston of a hydraulic actuator is generally provided with a seal assembly to prevent leakage of hydraulic fluid past the piston. Such seal assemblies often comprise a relatively hard primary or dynamic sealing ring that is backed up by a relatively softer secondary or static sealing ring. Moreover, such seal assemblies are often provided with back up rings made of relatively hard material, for example, polyamide.

However, a problem exists in that known back up rings are often displaced incident to assembly of the piston into the cylinder bore. The back up rings may be forced out of the piston gland upon assembly with a cylinder or may fall out of the piston gland before the piston is telescoped into the cylinder. Moreover, known back up rings are susceptible of improper installation in the piston gland.

The aforesaid problems are solved, in accordance with a preferred constructed embodiment of the present invention, by providing a mechanical interlock between either the primary or secondary piston sealing ring and the back up rings. Stated in another manner, a locking arrangement between the back up rings and seal elements in the form of a mechanical interface between the back up rings and one or more sealing elements of the piston ring assembly precludes inadvertent disassembly as well as improper installation of the back up rings. The locking feature can be arranged to provide similar benefits in bi-directional and uni-directional rod seal assemblies.

BRIEF DESCRIPTION OF THE DRAWINGS

FIG. 11 is a cross sectional view, similar to FIG. 2, of another embodiment of the invention.

DETAILED DESCRIPTION OF THE PREFERRED EMBODIMENT(S)

Figure 1:
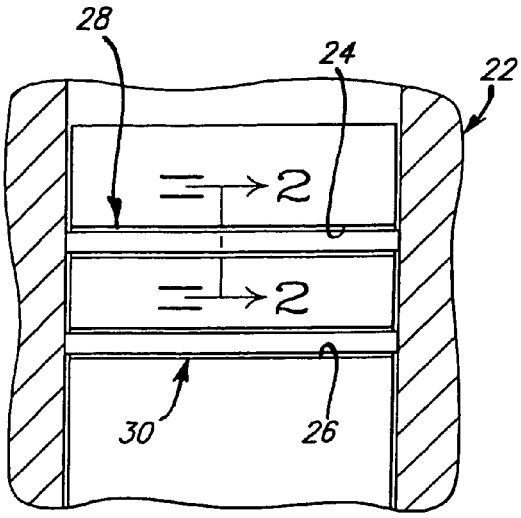
FIG. 1 across sectional view of a hydraulic cylinder having a piston provided with al assembly of the present invention.

As seen in FIG. 1, a piston 20 is slideably accepted in a cylinder 22. The piston 20 is provided with glands 24 and 26 for the acceptance seal assemblies 28 and 30 respectively.

Figure 2:
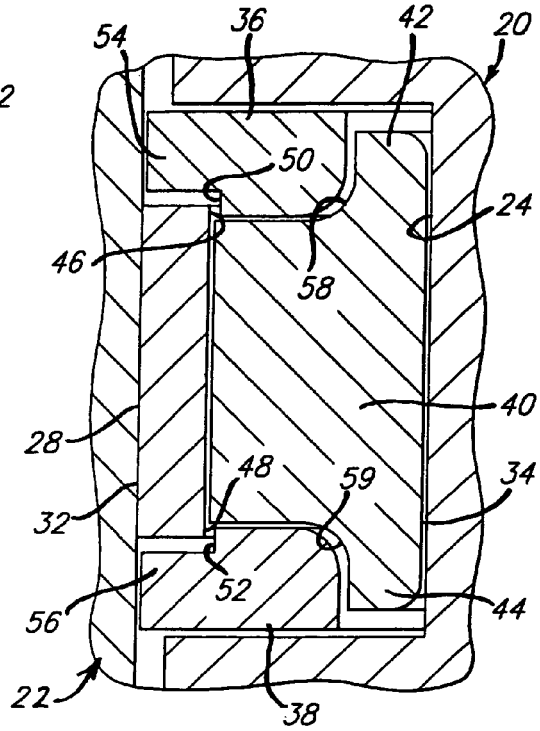
FIG. 2 is a cross sectional view taken along the line 2-2 of FIG. 1.

In accordance with a preferred embodiment of the instant invention, and as seen in FIG. 2, the seal assembly 28 comprises a dynamic or primary sealing element 32 having a durometer of 90 on the Rockwell "M" scale, a static or secondary sealing element 34 having a durometer of 70 on the Shore "A" scale, and a pair of back up rings 36 and 38 having durometer of 120 on the Rockwell "M" scale.

The secondary sealing element 34 is of T-shaped cross section defined by a stem portion 40 and axially oppositely extending flange portions 42 and 44. The primary sealing element 32 has an axial length that is greater than the axial length of the stem portion 40 of the secondary sealing element 34 thereby to define a pair of locking shoulders 46 and 48 which cooperate with shoulders 50 and 52 on the back up rings 36 and 38, respectively, to lock the back up rings 36 and 38 in the gland 24 of the piston 20. *For example, the back up rings 36 and 38 may have annular cylindrical shoulders 50 and 52 engagable with complementary cylindrical shoulders 46 and 48 on the primary sealing element 32.* Reverse assembly of the back up rings 36 and 38 is precluded by the relatively larger axial thickness of the radially inner portion thereof which will not pass the primary sealing element 32 if incorrect assembly is attempted. Moreover, the square corners 54 and 56 on the back up rings 36 and 38 would interfere with arcuate sections 58 and 59 on the static secondary seal 34 if incorrect assembly is attempted.

Figure 3:
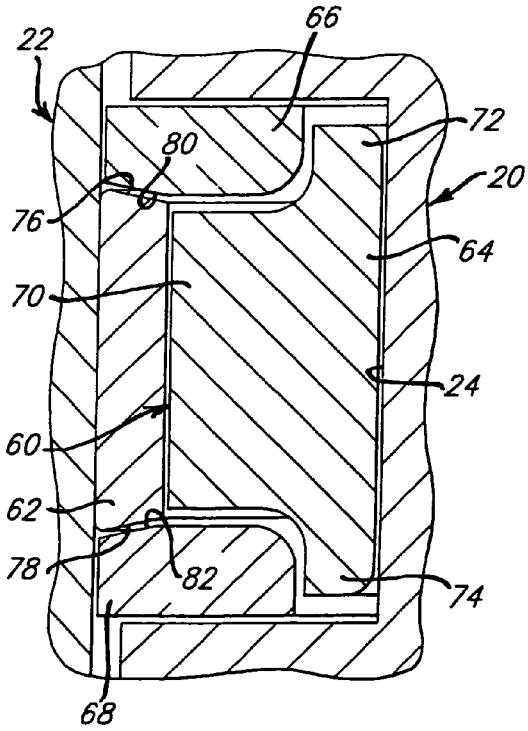
FIG. 3 cross sectional view, similar to FIG. 2, of another embodiment of the invention.

In accordance with another embodiment of the instant invention, and as seen in FIG. 3, a seal assembly 60 comprises a dynamic primary sealing element 62, a static secondary sealing element 64, and a pair of back up rings 66 and 68.

The secondary sealing element 64 is of T-shaped cross section defined by a stem portion 70 and axially oppositely extending flange portions 72 and 74. The primary sealing element 62 has an axial length on the radially outer surface thereof that is greater then the axial length of the radially inner surface thereof thereby to define a pair of angular locking surfaces 76 and 78 which cooperate with complimentary angular surfaces 80 and 82 on the back up rings 66 and 68, respectively, to lock the back up rings 66 and 68 in gland 24 of the piston 20.

Figure 4:
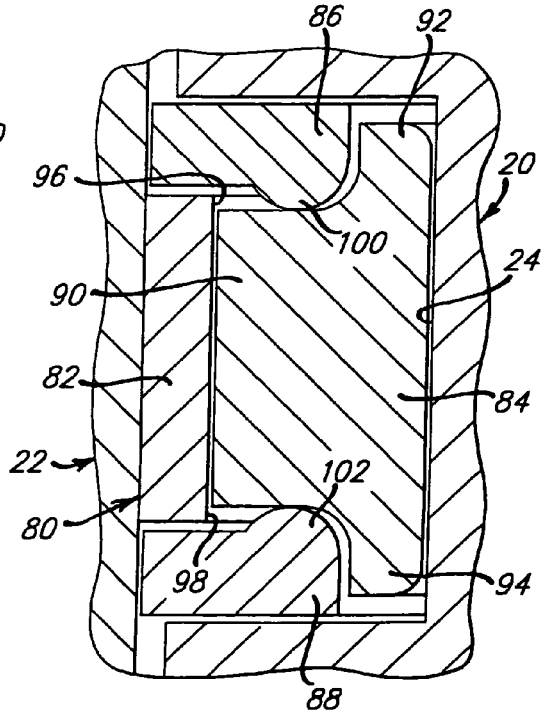
FIG. 4 is a cross sectional view, similar to FIG. 2, of another embodiment of the invention.

In accordance with another embodiment of the instant invention, and as seen in FIG. 4, a seal assembly 80 comprises a dynamic primary sealing element 82, a static secondary sealing element 84, and a pair of back up rings 86 and 88. The secondary sealing element 84 is of T-shaped cross section defined by a stem portion 90 and axially oppositely extending flange portions 92 and 94. The primary sealing element 82 has an axial length that is greater than the axial length of the stem portion 90 of the secondary sealing element 84 thereby to define a pair of locking shoulders 96 and 98 which cooperate with accurate shoulders 100 and 102 on the back up rings 86 and 88 respectively, to lock the back up rings 86 and 88 in the gland 24 of the piston 20. It is to be noted that the shoulders 100 and 102 preclude reverse installation of the back up rings 86 and 88.

Figure 5:
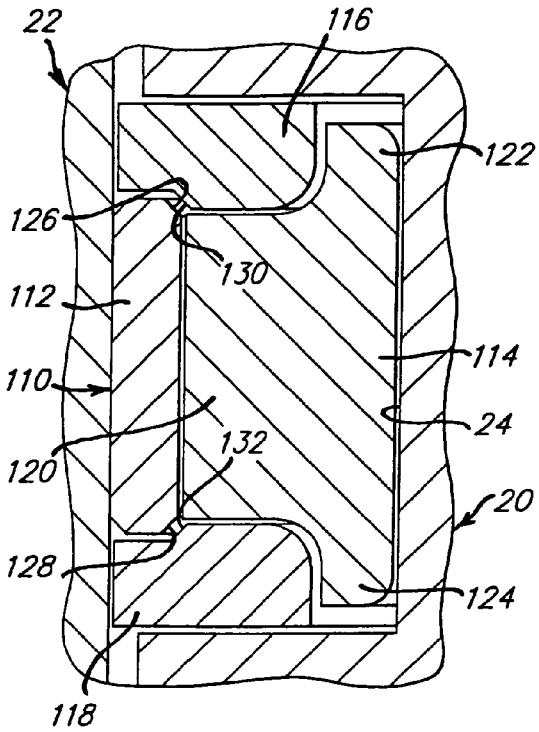
FIG. 5 a cross sectional view, similar to FIG. 2, of another embodiment of the invention.

In accordance with the embodiment of the instant invention seen in FIG. 5, a seal assembly 110 comprises a primary sealing element 112, a secondary sealing element 114, and a pair of back up rings 116 and 118. The secondary sealing element 114 is of T-shaped cross section defined by a stem portion 120 and axially oppositely extending flange portions 122 and 124. The primary sealing element 112 has an axial length that is greater than the axial length of the stem portion 120 of the secondary sealing element 114 thereby to define a pair of locking shoulders 126 and 128 which cooperate with shoulders 130 and 132 on the back up rings 116 and 118, respectively, to lock the back up rings 116 and 118 in the gland 24 of the piston 20.

Figure 6:
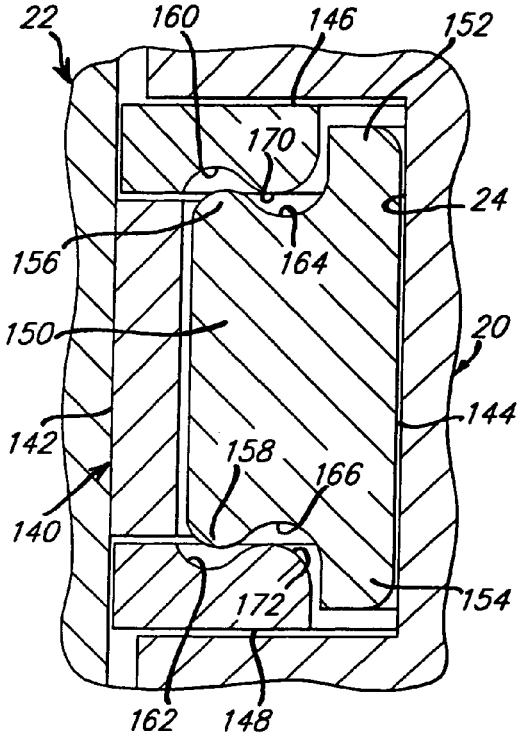
FIG. 6 a cross sectional view, similar to FIG. 2, of another embodiment of the invention.

In the embodiment of the instant invention seen in FIG. 6, a seal assembly 140 comprises a dynamic primary sealing element 142, a static secondary sealing element 144, and a pair of back up rings 146 and 148. The secondary sealing element 144 is of T-shaped cross section defined by a stem portion 150 and axially oppositely extending flange portions 152 and 154. The stem portion 150 of the secondary sealing element 144 has an axial length that is greater than the axial length of the primary sealing element 142 and is provided with a pair of accurate locking shoulders 156 and 158 which cooperate with accurate recesses 160 and 162 on the back up rings 146 and 148, respectively, to lock the back up rings 146 and 148 in the gland 24 of the piston 20. Additionally, accurate recesses 164 and 166 in the stem 150 of the secondary element 144, accept accurate protrusions 170 and 172 on the back up rings 146 and 148, respectively, to augment retention of the back up rings 146 and 148.

Figure 7:
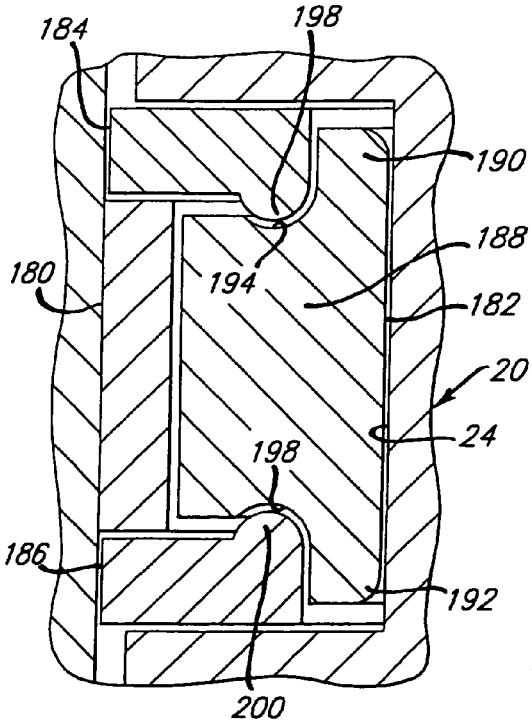
FIG. 7 is a cross sectional view, similar to FIG. 2, of another embodiment of the invention.

The embodiment of the instant invention seen in FIG. 7, comprises a primary sealing element 180, a secondary sealing element 182, and a pair of back up rings 184 and 186. The secondary sealing element 182 is of T-shaped cross section defined by a stem portion 188 and axially oppositely extending flange portions 190 and 192. The primary sealing element 180 has an axial length that is greater than the axial length of the stem portion 188 of the secondary sealing element 182. The stem 188 has a pair of accurate recesses 194 and 196 for the locking acceptance of a pair of protrusions 198 and 200 on the back up rings 184 and 186, respectively.

Figure 8:
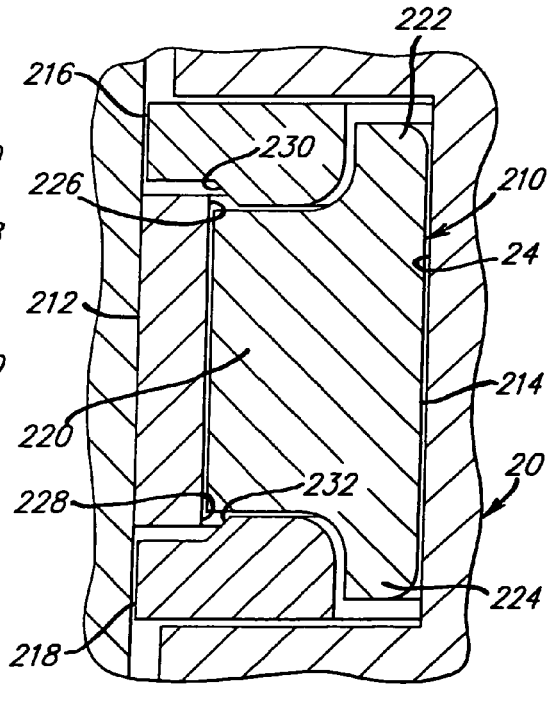
FIG. 8 is a cross sectional view, similar to FIG. 2, of another embodiment of the invention.

As seen in FIG. 8, a seal assembly 210 comprises a primary sealing element 212, a secondary sealing element 214, and a pair of back up rings 216 and 218. The secondary sealing element 214 is of T-shaped cross section defined by a stem portion 220 and axially oppositely extending flange portions 222 and 224. The primary sealing element 212 has an axial length that is greater than the axial length of the stem portion 220 of the secondary sealing element 214 thereby to define a pair of locking shoulders 226 and 228 which cooperate with angular shoulders 230 and 232 on the back up rings 216 and 218, respectively, to lock the back up rings 216 and 218 in the gland 24 of the piston 20.

Figure 9:
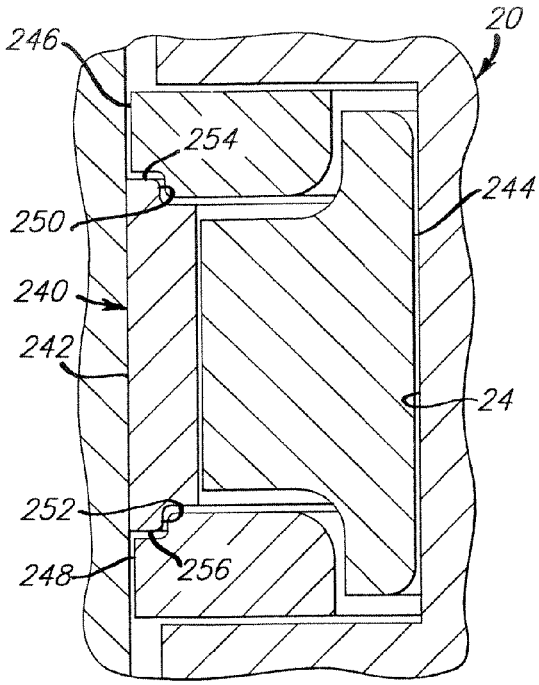
FIG. 9 is a cross sectional view, similar to FIG. 2, of another embodiment of the invention.

As seen in FIG. 9, a seal assembly 240 comprises a primary sealing element 242, a secondary sealing element 244, and a pair of back up rings 246 and 248. The primary sealing element 242 is notched at each axial end so as to define a pair of locking shoulders 250 and 252 which cooperate with complimentary notches 254 and 256 on the back up rings 246 and 248, respectively, to lock the back up rings 246 and 250 in the gland 24 of the piston 20.

Figure 10:
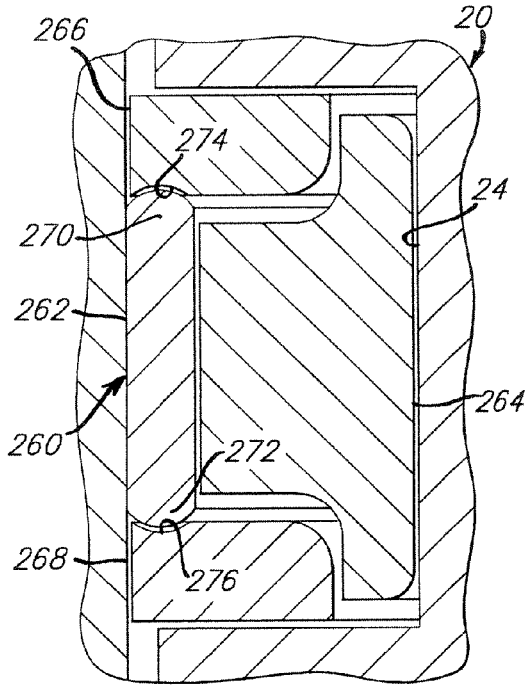
FIG. 10 is a cross sectional view, similar to FIG. 2, of another embodiment of the invention.

As seen in FIG. 10, a seal assembly 260 comprises a primary sealing element 262, a secondary sealing element 264, and a pair of back up rings 266 and 268. The primary sealing element 262 has [accurate] *arcuate* ends 270 and 272 that cooperate with [complimentary accurate] *complementary arcuate* detents 274 and 276 in the back up rings 266 and 268 respectively, to lock the back up rings 266, and 268 in the gland 24 of the piston 20.

In accordance with a three piece embodiment of the instant invention, and as seen in FIG. 11, a seal assembly 280 comprises a dynamic sealing element 282, and a pair of back up rings 284 and 286. The sealing element 282 is of T-shaped cross section defined by a stem portion 288 and axially oppositely extending flange portions 290 and 292. The stem 288 of the sealing element 282 is provided with a pair of arcuate grooves 294 and 296 for the acceptance of [complimentary accurate] *complementary arcuate* detents 298 and 300 on the back up rings 284 and 286 respectively, to lock the back up rings 284 and 286 in the gland 24 of the piston 20.

Figure 12:
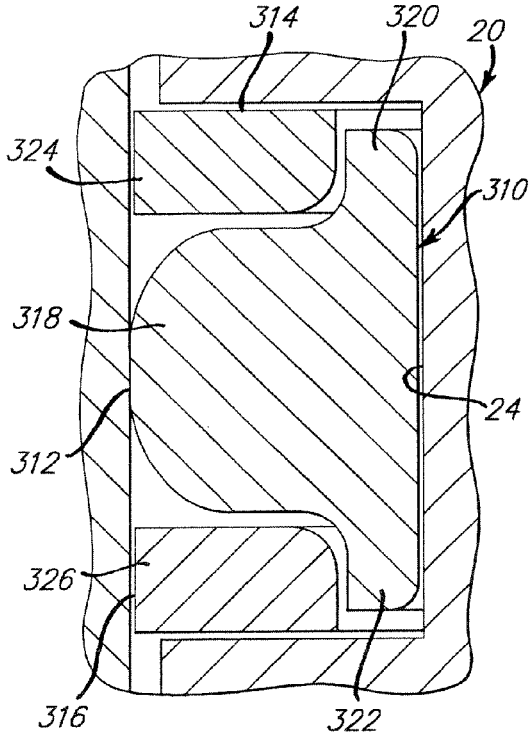
FIG. 12 is a cross sectional view, similar to FIG. 2 of yet another embodiment of the invention.

In accordance with another three piece embodiment of the instant invention, and as see in FIG. 12, a seal assembly 310 comprises a dynamic sealing element 312 and a pair of back up rings 314 and 316. The sealing element 312 is of T-shaped cross section defined by a stem portion 318 and axially oppositely extending flange portions 320 and 322. Square corners 324 and 326 on the back up rings 314 and 316, respectively, preclude improper assembly thereof with the sealing element 312 due to interference with arcuate section 328 and 330, respectively on the sealing element 312.

I claim:

1. A circular piston seal for acceptance in an annular gland in a piston comprising:

an annular primary sealing element of a first durometer;

a secondary sealing element of a second durometer relatively lower than said first durometer disposed radially inwardly of said primary sealing element and juxtaposed against a radially inner wall of the gland in the piston; and a pair of axially spaced back up rings disposed on opposite sides of said primary sealing element respectively, said back up rings having radially inner portions, respectively, spaced axially from one another a distance less than a maximum axial dimension of said primary sealing element whereby said backup rings are positively locked in the gland of said piston by said primary sealing element.

2. The piston seal of claim 1 wherein said back up rings have convex accurate surfaces intersecting a radially inner face, thereof, respectively, for engagement with complimentary axially spaced concave surfaces, respectively, on said secondary sealing element.

3. The piston seal of claim 1 wherein said back up rings have annular cylindrical shoulders engagable with complimentary cylindrical shoulders on said primary sealing element, respectively.

*4. The piston seal of claim 1, wherein said secondary sealing element includes a radially extending stem portion and an axially extending base portion.*

*5. The piston seal of claim 4, wherein said secondary sealing element exhibits a cross section which is substantially T-shaped.*

*6. The piston seal of claim 4, wherein said primary sealing element exhibits an axial length which is greater than an axial length of said radially extending stem portion of said secondary sealing element.*

*7. The piston seal of claim 4, wherein said radially extending stem portion of said secondary seal includes a reduced axial length portion configured to cooperatively mate with a protrusion on each of said backup rings.*

*8. The piston seal of claim 7, wherein said reduced axial length portion is located adjacent said axially extending base portion.*

*9. The piston seal of claim 1, wherein the primary sealing element includes a reduced axial length portion configured to cooperatively mate with a protrusion on each of said backup rings.*

*10. The piston seal of claim 1, wherein each of the backup rings exhibit an asymmetric cross section about an axis axially extending therethrough.*

*11. A seal assembly configured for acceptance in an annular gland comprising:*

*a first annular seal member configured to be in contact with a radially inner wall of the annular gland;*

*a second seal member disposed radially outwardly of the first annular seal member, wherein the first annular seal member is formed of a material of a first durometer and the second seal member is formed of a material comprising a second durometer greater than the first durometer; and*

*at least one back up ring at least partially disposed radially inwardly of the second seal member and sized and configured to be radially spaced from the radially inner wall of the annular gland by an axially extending flange portion of the first annular seal member, the at least one back up ring having an axially extending protrusion, wherein the axially extending protrusion of the at least one back up ring cooperatively mates with a recess in the first annular seal member located proximate to the flange portion to radially lock the at least one back up ring substantially within the gland.*

*12. A seal assembly configured for acceptance in an annular gland comprising:*

*an annular seal member including an axially extending base portion configured to be in contact with a radially inner wall of the annular gland and a radially extending stem portion, the radially extending stem portion including a first portion exhibiting a first axial length and a second portion exhibiting a second axial length smaller than the first axial length, the second portion being located radially inwardly from the first portion, and the axial length of the first portion being smaller that an axial length of the axially extending base portion;*

*two backup rings, each backup ring of the two backup rings including an axially extending portion configured to cooperatively mate with the second portion of the stem portion of the annular seal member to radially lock each back up ring substantially within the gland, wherein each backup ring exhibits an asymmetric cross section about an axis axially extending therethrough.*

*13. The seal assembly of claim 12, wherein the second portion of the stem portion of the annular seal member includes a first concave surface and a second axially spaced concave surface.*

*14. The seal assembly of claim 13, wherein the axially extending portion of each of the two backup rings includes a convex surface sized and configured to cooperatively mate with the first and second concave surfaces of the stem portion of the annular seal member.*

*15. The seal assembly of claim 14, wherein the annular seal member exhibits a cross section which is substantially T-shaped.*

* * * * *